US012742133B2

(12) United States Patent
Sakanishi

(10) Patent No.: US 12,742,133 B2
(45) Date of Patent: Sep. 22, 2026

(54) DETERGENT COMPOSITION AND CHEMICAL-MECHANICAL POLISHING COMPOSITION COMPRISING AN ALKANOL HYDROXYLAMINE AND POLYGLYCEROL DERIVATIVE MIXTURE

(71) Applicant: DAICEL CORPORATION, Osaka (JP)

(72) Inventor: Yuichi Sakanishi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 661 days.

(21) Appl. No.: 17/924,489

(22) PCT Filed: Apr. 21, 2021

(86) PCT No.: PCT/JP2021/016143
§ 371 (c)(1),
(2) Date: Nov. 10, 2022

(87) PCT Pub. No.: WO2021/230026
PCT Pub. Date: Nov. 18, 2021

(65) Prior Publication Data

US 2023/0174892 A1 Jun. 8, 2023

(30) Foreign Application Priority Data

May 11, 2020 (JP) ................................ 2020-083059

(51) Int. Cl.
*C11D 1/40* (2006.01)
*C11D 1/62* (2006.01)
*C11D 3/20* (2006.01)

(52) U.S. Cl.
CPC .................. *C11D 1/40* (2013.01); *C11D 1/62* (2013.01); *C11D 3/2065* (2013.01); *C11D 2111/22* (2024.01)

(58) Field of Classification Search
CPC ........... C11D 1/62; C11D 3/30; C11D 3/3917; C11D 2111/22
See application file for complete search history.

(56) References Cited

U.S. PATENT DOCUMENTS 5,418,117 A * 5/1995 Marsden .............. G03C 7/3017 430/414
5,587,109 A * 12/1996 Greaves .................... C02F 1/54 422/12
7,435,712 B2 10/2008 Misra et al.
7,498,295 B2 3/2009 Fisher et al.
8,900,371 B2 12/2014 Mizuta et al.
10,597,609 B2 3/2020 Namiki et al.
10,597,616 B2 3/2020 Namiki et al.
2005/0181961 A1 8/2005 Misra et al.
2006/0003910 A1* 1/2006 Hsu ....................... C23F 11/165 510/176
2006/0293208 A1* 12/2006 Egbe .................... C11D 7/3263 257/E21.255
2007/0069176 A1* 3/2007 Kato .................... C09K 3/1463 252/79.4
2007/0235061 A1 10/2007 Mizuta et al.
2008/0047592 A1 2/2008 Fisher et al.
2009/0104778 A1* 4/2009 Sakanishi ......... H01L 21/31053 438/692
2009/0233827 A1* 9/2009 Egbe ....................... G03F 7/425 510/176
2012/0000485 A1 1/2012 Mizuta et al.
(Continued)

FOREIGN PATENT DOCUMENTS

JP 2002-359223 A 12/2002
JP 2007-525836 A 9/2007
(Continued)

OTHER PUBLICATIONS

Chinese Office Action and Search Report dated Sep. 27, 2023 for Application No. 202180034358.4.
(Continued)

*Primary Examiner* — Charles I Boyer
(74) *Attorney, Agent, or Firm* — Birch, Stewart, Kolasch & Birch, LLP

(57) ABSTRACT

A detergent composition and a polishing composition are provided. The detergent composition facilitates sufficient removal of polishing agents, metal microparticles, and anti-corrosives in cleaning of a semiconductor substrate and long-term maintenance of flatness of a metal wiring surface after cleaning and achieves excellent quality stability for a long period of time; and the polishing composition facilitates suppression of scratching on a polished object such as a semiconductor substrate, and reduction of filter clogging. A detergent composition containing an alkanol hydroxylamine compound represented by General Formula (1) and having a pH of 10 to 13, and a chemical-mechanical polishing composition containing the detergent composition and a polishing agent. In Formula (1), $R^{a1}$ and $R^{a2}$ are the same or different and each represents a hydrogen atom or an alkyl group having from 1 to 10 carbons and having from 1 to 3 hydroxyl groups, with proviso that $R^{a1}$ and $R^{a2}$ are not simultaneously hydrogen atoms, and a total number of hydroxyl groups present in $R^{a1}$ and $R^{a2}$ is not 0.

(1)

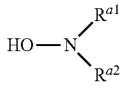

18 Claims, No Drawings

(56) References Cited

U.S. PATENT DOCUMENTS

| | | | | |
|---|---|---|---|---|
| 2012/0157368 | A1* | 6/2012 | Mizuta | G03F 7/425 510/176 |
| 2013/0261040 | A1* | 10/2013 | Kawada | H01L 21/02074 510/175 |
| 2016/0201016 | A1* | 7/2016 | Ivanov | C11D 7/06 510/175 |
| 2016/0272924 | A1* | 9/2016 | Kajikawa | C11D 7/265 |
| 2018/0187128 | A1 | 7/2018 | Namiki et al. | |
| 2018/0187133 | A1 | 7/2018 | Namiki et al. | |
| 2019/0177669 | A1* | 6/2019 | Kamimura | H01L 21/304 |
| 2020/0241424 | A1* | 7/2020 | Eto | G03F 7/425 |
| 2021/0130749 | A1 | 5/2021 | Sakanishi | |

FOREIGN PATENT DOCUMENTS

| | | | |
|---|---|---|---|
| JP | 2010-235725 | A | 10/2010 |
| JP | 2012-186470 | A | 9/2012 |
| JP | 2018-109153 | A | 7/2018 |
| JP | 2018-109154 | A | 7/2018 |
| KR | 10-2019-0103208 | A | 9/2019 |
| WO | WO 2005/040324 | A1 | 5/2005 |
| WO | WO 2012/073909 | A1 | 6/2012 |

OTHER PUBLICATIONS

International Search Report for International Application No. PCT/JP2021/016143, dated Aug. 3, 2021, with an English translation.

Written Opinion of the International Searching Authority for International Application No. PCT/JP2021/016143, dated Aug. 3, 2021, with an English translation.

Korean Office Action for Korean Application No. 10-2022-7042881, dated Dec. 10, 2025.

* cited by examiner

DETERGENT COMPOSITION AND CHEMICAL-MECHANICAL POLISHING COMPOSITION COMPRISING AN ALKANOL HYDROXYLAMINE AND POLYGLYCEROL DERIVATIVE MIXTURE

TECHNICAL FIELD

The present disclosure relates to a detergent composition and a chemical-mechanical polishing composition. The present application claims priority from the Japanese Patent Application No. 2020-083059 filed in Japan on May 11, 2020, the content of which is incorporated herein by reference.

BACKGROUND ART

In the field of semiconductor devices, further miniaturization and integration are in progress. Thus, there is an increased demand for a semiconductor substrate having a multilayer wiring structure including metal wiring.

Production of such a semiconductor substrate requires advanced planarization technology, and chemical-mechanical polishing (CMP) is used. The CMP is a method of planarization by polishing metal wiring and the like by a slurry containing a polishing agent. The polishing agent and metal microparticles (polishing sludge) tend to remain as residues.

Meanwhile, metal wiring is easily oxidized and corroded during polishing. Therefore, in the CMP process, an anticorrosive (corrosion inhibitor), such as benzotriazole (BTA) or quinaldic acid (QCA), is added. The anticorrosive forms a film on a surface of metal wiring, the film including a complex with a surface metal of the metal wiring and prevents corrosion.

As the detergent used in post-CMP cleaning to remove polishing agents, metal microparticles, and anticorrosives, the following materials are known: for example, a detergent for copper wiring semiconductor, the detergent containing a specific amine and a specific polyphenol compound and the like (Patent Document 1); a cleaning agent for a substrate having a copper wiring, the cleaning agent containing a specific amino acid and alkanol hydroxylamine (Patent Document 2); a cleaning agent for a copper wiring semiconductor, the cleaning agent containing a specific cyclic amine and a polyphenol-based reducing agent having from 2 to 5 hydroxyl groups (Patent Document 3); a composition for cleaning a semiconductor work-piece, the composition containing an ammonium hydroxide compound, a chelating agent, and a corrosion-inhibiting compound (Patent Document 4); a cleaning agent for substrate, the cleaning agent containing an organic acid having at least one carboxyl group and/or a complexing agent, and a specific organic solvent (Patent Document 5); and a cleaning liquid containing at least one organic alkali (Patent Document 6).

However, in recent years, in addition to an increased demand for higher level of removal of polishing agents, polishing sludge, and anticorrosives, there is an demand for removal of films caused by anticorrosives, maintenance of flatness after post-CMP cleaning (prevention of uneven growth of oxide films), and stability of detergent quality.

CITATION LIST

Patent Document

Patent Document 1: JP 2012-186470 A
Patent Document 2: WO 2012/073909
Patent Document 3: JP 2010-235725 A
Patent Document 4: JP 2007-525836 A
Patent Document 5: WO 2005/040324
Patent Document 6: JP 2002-359223 A

SUMMARY OF INVENTION

Technical Problem

An object of the present disclosure is to provide a detergent composition that is capable of sufficient removal of polishing agents, metal microparticles, and anticorrosives in cleaning of a semiconductor substrate and also capable of long-term maintenance of flatness of a metal wiring surface after cleaning, and achieving excellent quality stability for a long period of time. Another object of the present disclosure is to provide a detergent composition that is capable of sufficient removal of polishing agents, metal microparticles, and anticorrosives in cleaning of a semiconductor substrate, sufficient removal of films containing anticorrosives, rapid formation of an oxide film, and long-term maintenance of flatness of a metal wiring surface after cleaning, and achieving excellent quality stability for a long period of time.

Furthermore, as the inventor of the present disclosure studied a polishing composition for polishing a semiconductor substrate at the same time, the inventor found that, when a polishing composition containing the detergent composition is used for polishing, polishing agents and metal microparticles are easily removed in cleaning after the polishing, and flatness of a metal wiring surface after the cleaning is maintained even after a long period of standby. However, such a polishing composition had problems that the composition easily produces scratches on a polished object and frequently causes filter clogging in filtration at the time of reuse. Then, another object of the present disclosure is to provide a chemical-mechanical polishing composition that can suppress scratching on a polished object, such as a semiconductor substrate, and that can reduce filter clogging.

Solution to Problem

As a result of diligent research to solve the problems described above, the inventor of the present disclosure found that the problems described above can be solved by using a detergent composition containing a specific alkanol hydroxylamine compound and having a pH adjusted to a specific pH, and a chemical-mechanical polishing composition containing the detergent composition. The present disclosure has been completed based on these findings.

That is, the present disclosure provides a detergent composition containing an alkanol hydroxylamine compound represented by General Formula (1) and having a pH of 10 to 13,

[Chem. 1]

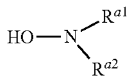

(1)

where $R^{a1}$ and $R^{a2}$ are the same or different and each represents a hydrogen atom or an alkyl group having from 1 to 10 carbons that may have from 1 to 3 hydroxyl groups, with the proviso that $R^{a1}$ and $R^{a2}$ are not simultaneously hydrogen atoms; and a total number of hydroxyl groups present in $R^{a1}$ and $R^{a2}$ is not 0.

$R^{a1}$ and $R^{a2}$ described above are preferably alkyl groups having from 1 to 10 carbons and having 1 hydroxyl group.

The content of the alkanol hydroxylamine compound in the detergent composition is preferably from 0.05 to 25 wt. %.

The detergent composition may further contain a basic compound besides the alkanol hydroxylamine compound.

The basic compound is preferably a quaternary ammonium hydroxide represented by General Formula (2),

[Chem. 2]

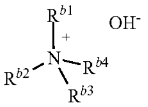

(2)

where $R^{b1}$ to $R^{b4}$ are the same or different and each represents a hydrocarbon group that may have a substituent.

The basic compound is preferably ammonia, tetramethylammonium hydroxide, or 2-hydroxyethyltrimethylammonium hydroxide.

The content of the basic compound in the detergent composition is preferably from 0.01 to 5 wt. %.

The weight ratio of the alkanol hydroxylamine compound to the basic compound (alkanol hydroxylamine compound/basic compound) in the detergent composition is preferably from 1 to 10.

The detergent composition preferably further contains a polyglycerol derivative represented by General Formula (3),

[Chem. 3]

$$R^cO\text{—}(C_3H_6O_2)_n\text{—}H \quad (3)$$

where $R^c$ represents a hydrogen atom or a hydrocarbon group that may have a hydroxyl group and n is an integer from 2 to 40.

The detergent composition may further contain a chelating agent represented by General Formula (4),

[Chem. 4]

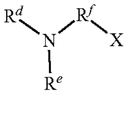

(4)

where X represents a carboxyl group or a phosphonic acid group; $R^d$ and $R^e$ are the same or different and each represents a hydrogen atom or a monovalent hydrocarbon group that may have a substituent, and R represents a divalent hydrocarbon group that may have a substituent, and any two of $R^d$ to $R^f$ may bond to each other to form a ring together with an adjacent nitrogen atom.

The present disclosure also provides a chemical-mechanical polishing composition containing the detergent composition described above, and a polishing agent.

Advantageous Effects of Invention

The detergent composition of the present disclosure is used for cleaning a semiconductor substrate after CMP process, and is capable of sufficient removal of polishing agents, metal microparticles, and anticorrosives and long-term maintenance of substrate flatness after the cleaning, and achieves quality stability for a long period of time.

Furthermore, the chemical-mechanical polishing composition of the present disclosure can suppress scratching on a polished object, such as a semiconductor substrate, and reduce filter clogging during filtration at the time of reuse.

DESCRIPTION OF EMBODIMENTS

Detergent Composition

The detergent composition of the present disclosure contains an alkanol hydroxylamine compound and has a pH of 10 to 13.

The detergent composition of the present disclosure can be preferably used as a detergent to clean a semiconductor substrate (e.g., silicon substrates, silicon carbide substrates, gallium arsenide substrates, gallium phosphide substrates, and indium phosphide substrates), and can be more preferably used as a post-CMP detergent for cleaning a semiconductor substrate including metal wiring (e.g., copper wiring, copper alloy wiring, tungsten wiring, and aluminum wiring) in cleaning after the CMP process, and even more preferably used as a post-CMP detergent for cleaning a semiconductor substrate including copper wiring or copper alloy wiring.

When the detergent composition of the present disclosure is employed, the composition removes surface film containing a complex of an anticorrosive, such as BTA and QCA, and a surface metal of the metal wiring formed in the CMP process sufficiently, and facilitates production of a semiconductor substrate that sustains flatness of the metal wiring surface for a long period of time.

Alkanol Hydroxylamine Compound

The alkanol hydroxylamine compound according to the present disclosure is a compound represented by General Formula (1) and has a function as a reducing agent. In Formula (1), $R^{a1}$ and $R^{a2}$ are the same or different and each represents a hydrogen atom or an alkyl group having from 1 to 10 carbons that may have from 1 to 3 hydroxyl groups, with the proviso that $R^{a1}$ and $R^{a2}$ are not simultaneously hydrogen atoms, and a total number of hydroxyl groups present in $R^{a1}$ and $R^{a2}$ is not 0.

[Chem 5]

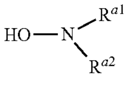

(1)

When the alkanol hydroxylamine compound is used, corrosion inhibition effect for easily corrodible metals such as copper, tungsten, and silicide such as SiGe, in addition to cobalt can be achieved.

$R^{a1}$ and $R^{a2}$ described above are a hydrogen atom, an alkyl group, or an alkanol group, and the hydroxyl group in the alkanol group may constitute any one of a primary alcohol, secondary alcohol, or tertiary alcohol but preferably constitutes a primary alcohol or secondary alcohol, and more preferably constitutes a primary alcohol.

The total number of hydroxyl groups present in $R^{a1}$ and $R^{a2}$ is not 0. That is, at least one of $R^{a1}$ or $R^{a2}$ is an alkanol group.

$R^{a1}$ and $R^{a2}$ described above are preferably alkyl groups having from 1 to 10 carbons and having 1 hydroxyl group.

The alkyl group having from 1 to 10 carbons of $R^{a1}$ and $R^{a2}$ described above is a linear, branched or cyclic alkyl group and is preferably a linear alkyl group having from 1 to 5 carbons or a branched alkyl group having from 3 to 5 carbons. Examples of the alkyl group having from 1 to 10 carbons include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an n-octyl group, an n-nonyl group, and an n-decyl group. Among these, an ethyl group, an n-propyl group, and an isopropyl group are preferred.

Examples of the alkanol group of $R^{a1}$ and $R^{a2}$ described above include a 1-hydroxyethyl group, a 2-hydroxyethyl group, a 1,2-dihydroxyethyl group, a 2,2-dihydroxyethyl group, a 1-hydroxy-n-propyl group, a 2-hydroxy-n-propyl group, a 3-hydroxy-n-propyl group, a 1,2-dihydroxy-n-propyl group, a 1,3-dihydroxy-n-propyl group, a 2,2-dihydroxy-n-propyl group, a 2,3-dihydroxy-n-propyl group, a 3,3-dihydroxy-n-propyl group, a 1,2,3-trihydroxy-n-propyl group, a 2,2,3-trihydroxy-n-propyl group, a 2,3,3-trihydroxy-n-propyl group, a 1-hydroxyisopropyl group, a 2-hydroxyisopropyl group, a 1,1-dihydroxyisopropyl group, a 1,2-dihydroxyisopropyl group, a 1,3-dihydroxyisopropyl group, a 1,2,3-trihydroxyisopropyl group, a 1-hydroxy-n-butyl group, a 2-hydroxy-n-butyl group, a 3-hydroxy-n-butyl group, a 4-hydroxy-n-butyl group, a 1,2-dihydroxy-n-butyl group, a 1,3-dihydroxy-n-butyl group, a 1,4-dihydroxy-n-butyl group, a 2,2-dihydroxy-n-butyl group, a 2,3-dihydroxy-n-butyl group, a 2,4-dihydroxy-n-butyl group, a 3,3-dihydroxy-n-butyl group, a 3,4-dihydroxy-n-butyl group, a 4,4-dihydroxy-n-butyl group, a 1,2,3-trihydroxy-n-butyl group, a 1,2,4-trihydroxy-n-butyl group, a 1,3,4-trihydroxy-n-butyl group, a 2,2,3-trihydroxy-n-butyl group, a 2,2,4-trihydroxy-n-butyl group, a 2,3,3-trihydroxy-n-butyl group, a 3,3,4-trihydroxy-n-butyl group, a 2,4,4-trihydroxy-n-butyl group, a 3,4,4-trihydroxy-n-butyl group, a 2,3,4-trihydroxy-n-butyl group, a 1-hydroxy-sec-butyl group, a 2-hydroxy-sec-butyl group, a 3-hydroxy-sec-butyl group, a 4-hydroxy-sec-butyl group, a 1,1-dihydroxy-sec-butyl group, a 1,2-dihydroxy-sec-butyl group, a 1,3-dihydroxy-sec-butyl group, a 1,4-dihydroxy-sec-butyl group, a 2,3-dihydroxy-sec-butyl group, a 2,4-dihydroxy-sec-butyl group, a 3,3-dihydroxy-sec-butyl group, a 3,4-dihydroxy-sec-butyl group, a 4,4-dihydroxy-sec-butyl group, a 1-hydroxy-2-methyl-n-propyl group, a 2-hydroxy-2-methyl-n-propyl group, a 3-hydroxy-2-methyl-n-propyl group, a 1,2-dihydroxy-2-methyl-n-propyl group, a 1,3-dihydroxy-2-methyl-n-propyl group, a 2,3-dihydroxy-2-methyl-n-propyl group, a 3,3-dihydroxy-2-methyl-n-propyl group, a 3-hydroxy-2-hydroxymethyl-n-propyl group, a 1,2,3-trihydroxy-2-methyl-n-propyl group, a 1,3,3-trihydroxy-2-methyl-n-propyl group, a 2,3,3-trihydroxy-2-methyl-n-propyl group, a 1,3-dihydroxy-2-hydroxymethyl-n-propyl group, a 2,3-dihydroxy-2-hydroxymethyl-n-propyl group, a 1-hydroxy-2-methyl isopropyl group, a 1,3-dihydroxy-2-methyl isopropyl group, and a 1,3-dihydroxy-2-hydroxymethyl isopropyl group. Among these, a 2-hydroxyethyl group, a 2-hydroxy-n-propyl group, and 2-hydroxyisopropyl group are preferred.

The alkanol hydroxylamine compound according to the present disclosure is a monoalkanol hydroxylamine (a hydroxyl group, a hydrogen atom, and an alkanol group are bonded to a nitrogen atom), an alkyl alkanol hydroxylamine (a hydroxyl group, an alkyl group, and an alkanol group are bonded to a nitrogen atom) or a dialkanol hydroxylamine (a hydroxyl group and two alkanol groups are bonded to a nitrogen atom), and is preferably a dialkanol hydroxylamine. Examples of the alkanol hydroxylamine compound include N-(2-hydroxyethyl)-N-hydroxylamine, N-(1,3-dihydroxy-n-propyl)-N-hydroxylamine, N-ethyl-N-hydroxymethyl-N-hydroxylamine, N-ethyl-N-(2-hydroxyethyl)-N-hydroxylamine, N-ethyl-N-(1,2-dihydroxyethyl)-N-hydroxylamine, N,N-bis(1,2-dihydroxyethyl)-N-hydroxylamine, N,N-bis(2-hydroxyethyl)-N-hydroxylamine, and N,N-bis(2-hydroxypropyl)-N-hydroxylamine. Among these, N,N-bis(2-hydroxyethyl)-N-hydroxylamine is more preferred.

These alkanol hydroxylamine compounds effectively contribute to removal of polishing agents, polishing sludge, anticorrosives, and films containing anticorrosives. These alkanol hydroxylamine compounds further effectively contribute to suppression of uneven corrosion and oxidation of the metal wiring surface, and thus a substrate that has left stand after the post-CMP cleaning sustains flatness.

As these alkanol hydroxylamine compounds, for example, an alkanol hydroxylamine compound obtained by a known method, such as a method of oxidizing a corresponding alkanolamine by using an oxidizing agent such as hydrogen peroxide, may be used, or a commercially available alkanol hydroxylamine compound may be used.

A content of the alkanol hydroxylamine compound in the detergent composition of the present disclosure is preferably from 0.05 to 25 wt. %, more preferably from 0.1 to 15 wt. %, and even more preferably from 0.2 to 0.5 wt. %. When the content of the alkanol hydroxylamine compound is less than 0.05 wt. %, the composition may not sufficiently prevent oxidation or corrosion of metal wiring. When the content is greater than 25 wt. %, the alkanol hydroxylamine compound may not dissolve in water and the composition may undergo phase separation.

The water used in an aqueous solution according to the present disclosure only has to be water that does not adversely affect a substrate during a production process of a semiconductor device. Examples of the water include distilled water, purified water such as deionized water, and ultrapure water. Among these, ultrapure water is preferred.

Basic Compound

A pH of the detergent composition according to the present disclosure may be adjusted by adding a basic compound besides the alkanol hydroxylamine compound.

Examples of the basic compound include inorganic basic compounds and organic basic compounds.

Inorganic basic compounds include alkali metal hydroxides (e.g., sodium hydroxide and potassium hydroxide), alkaline earth metal hydroxides (e.g., $Mg(OH)_2$), and ammonia. Among these, from the perspective of containing no metal ions, ammonia is preferred.

Examples of the organic basic compound include primary to tertiary amines, alkanol amines, and quaternary ammonium hydroxides. Among these, quaternary ammonium hydroxides are preferred.

Examples of the primary to tertiary amines include methylamine, ethylamine, propylamine, butylamine, pentylamine, 1,3-propanediamine, dimethylamine, diethylamine, dipropylamine, dibutylamine, dipentylamine, piperidine, piperazine, trimethylamine, and triethylamine.

Examples of the alkanolamine include monoethanolamine, diethanolamine, triethanolamine, N-methylethanolamine, N-methyl-N,N-diethanolamine, N,N-dimethylethanolamine, N,N-diethylethanolamine, N,N-dibutylethanolamine, N-(D-aminoethyl)ethanolamine, N-ethylethanolamine, monopropanolamine, dipropanolamine, tripropanolamine, monoisopropanolamine, diisopropanolamine, triisopropanolamine, tris(hydroxymethyl) aminomethane, and 2-morpholinomethanol.

The quaternary ammonium hydroxide is a compound represented by General Formula (2). In Formula (2), $R^{b1}$ to $R^{b4}$ are the same or different and each represents a hydrocarbon group that may have a substituent, and $OH^-$ represents a hydroxide ion.

[Chem. 6]

(2)

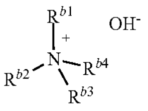

Examples of the hydrocarbon group of $R^{b1}$ to $R^{b4}$ described above include aliphatic hydrocarbon groups and aromatic hydrocarbon groups.

The aliphatic hydrocarbon group of $R^{b1}$ to $R^{b4}$ described above is a linear, branched or cyclic alkyl group having from 1 to 10 carbons and is preferably a linear alkyl group having from 1 to 5 carbons or a branched alkyl group having from 3 to 5 carbons. Examples of the aliphatic hydrocarbon group include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an n-octyl group, an n-nonyl group, and an n-decyl group. Among these, a methyl group, an ethyl group, an n-propyl group, and an isopropyl group are preferred.

The aromatic hydrocarbon group of $R^{b1}$ to $R^{b4}$ is an aryl group having from 6 to 14 carbons. Examples of the aromatic hydrocarbon group include a phenyl group and a naphthyl group.

Examples of the substituent that may be included in $R^{b1}$ to $R^{b4}$ described above include a hydroxyl group, halogen atoms (e.g., fluorine atom, chlorine atom, and bromine atom), alkoxy groups (e.g., methoxy group, ethoxy group, propoxy group, isopropyloxy group, butoxy group, and isobutyloxy group), aryl groups (e.g., phenyl group and naphthyl group), aryloxy groups (e.g., phenoxy group, tolyloxy group, and naphthyloxy group), aralkyloxy groups (e.g., benzyloxy group and phenethyloxy group), acyloxy groups (e.g., acetyloxy group, propionyloxy group, and benzoyloxy group), a carboxyl group, alkoxycarbonyl groups (e.g., methoxycarbonyl group, ethoxycarbonyl group, propoxycarbonyl group, and butoxycarbonyl group), aryloxycarbonyl groups (e.g., phenoxycarbonyl group, tolyloxycarbonyl group, and naphthyloxycarbonyl group), aralkyloxycarbonyl groups (e.g., benzyloxycarbonyl group), an amino group, primary or secondary amino groups (e.g., methylamino group, ethylamino group, dimethylamino group, and diethylamino group), acylamino groups (e.g., acetylamino group, propionylamino group, and benzoylamino group), acyl groups (e.g., acetyl group, propionyl group, and benzoyl group), and an oxo group.

Examples of the ammonium cation of the quaternary ammonium hydroxide include tetramethylammonium, trimethylethylammonium, dimethyldiethylammonium, triethylmethylammonium, tripropylmethylammonium, tributylmethylammonium, trioctylmethylammonium, tetraethylammonium, trimethylpropylammonium, trimethylphenylammonium, benzyltrimethylammonium, benzyltriethylammonium, diallyldimethylammonium, n-octyltrimethylammonium, tetrapropylammonium, tetra-n-butylammonium, 2-hydroxyethyltrimethylammonium, 2-hydroxypropyltrimethylammonium, and phenyltrimethylammonium.

Examples of the quaternary ammonium hydroxide include tetramethylammonium hydroxide, trimethylethylammonium hydroxide, dimethyldiethylammonium hydroxide, triethylmethylammonium hydroxide, tripropylmethylammonium hydroxide, tributylmethylammonium hydroxide, trioctylmethylammonium hydroxide, tetraethylammonium hydroxide, trimethylpropylammonium hydroxide, trimethylphenylammonium hydroxide, benzyltrimethylammonium hydroxide, benzyltriethylammonium hydroxide, diallyldimethylammonium hydroxide, n-octyltrimethylammonium hydroxide, tetrapropylammonium hydroxide, tetra-n-butylammonium hydroxide, 2-hydroxyethyltrimethylammonium hydroxide (choline), 2-hydroxypropyltrimethylammonium (O-methylcholine), and phenyltrimethylammonium hydroxide. Among these, tetramethylammonium hydroxide and 2-hydroxyethyltrimethylammonium hydroxide (choline) are preferred.

The basic compound may be used alone or in combination of two or more types.

A content of the basic compound in the detergent composition of the present disclosure is preferably from 0.01 to 5 wt. %, more preferably from 0.05 to 3 wt. %, and even more preferably from 0.1 to 1 wt. %.

Polyglycerol Derivative

The polyglycerol derivative of the present disclosure is represented by Formula (3) below. In Formula (3), $R^c$ represents a hydrogen atom or a hydrocarbon group that may have a hydroxyl group. n is the average degree of polymerization of a glycerol unit, and is an integer from 2 to 40.

[Chem. 7]

$$R^cO\text{-}(C_3H_6O_2)_n\text{-}H \qquad (3)$$

Examples of the hydrocarbon group of $R^c$ include an alkyl group, an alkenyl group, an alkapolyenyl group, and an acyl group.

$R^c$ described above is preferably an alkyl group, an acyl group, or a hydrogen atom.

The alkyl group described above is a linear alkyl group having preferably from 1 to 18 carbons, more preferably from 3 to 18 carbons, and even more preferably from 12 to 18 carbons, or preferably from 3 to 18 carbons, and more preferably a branched alkyl group having from 3 to 18 carbons. Examples of the alkyl group include a methyl group, an ethyl group, a propyl group, a pentyl group, a hexyl group, a heptyl group, a 2-ethylhexyl group, an octyl group, an isooctyl group, a decyl group, an isodecyl group, a dodecyl group (lauryl group), a tetradecyl group, an oleyl group, an isododecyl group, a myristyl group, an isomyristyl group, a cetyl group, an isocetyl group, a stearyl group, and an isostearyl group. Among these, a linear alkyl group is preferred, a dodecyl group (lauryl group) and a stearyl group are more preferred, and a dodecyl group (lauryl group) is even more preferred.

The alkenyl group describe above is a linear alkenyl group having preferably from 2 to 18 carbons, and more preferably from 8 to 18 carbons, or a branched alkenyl group having preferably from 3 to 18 carbons, and more preferably from 8 to 18 carbons. Examples of the alkenyl group include a vinyl group, a propenyl group, an allyl group, a hexenyl group, a 2-ethylhexenyl group, and an oleyl group. Among these, a hexenyl group and an oleyl group are more preferred.

The alkapolyenyl group described above is preferably an alkapolyenyl having from 2 to 18 carbons. Examples of the alkapolyenyl group include an alkadienyl group, an alkatrienyl group, an alkatetraenyl group, a linoleyl group, and a linolenyl group.

The acyl group described above is an aliphatic acyl group having from 2 to 24 carbons or an aromatic acyl group. Examples of the aliphatic acyl group include an acetyl group, a propionyl group, a butyryl group, an isobutyryl group, a stearoyl group, and an oleoyl group. Examples of the aromatic acyl group include a benzoyl group, a toluoyl group, and a naphthoyl group. Among these, aliphatic acyl groups are preferred, an acetyl group, a butyryl group, a stearoyl group, and an oleoyl group are more preferred, and an acetyl group and oleoyl group are even more preferred.

n described above is from 2 to 40, preferably from 4 to 30, and more preferably from 4 to 20. When n is less than 2, water solubility becomes low, and detergent properties tend to be deteriorated. Meanwhile, when n is greater than 40, water solubility becomes excessively high, and water dispersibility tends to decrease, and foaming properties and workability tend to decrease.

The structure $-C_3H_6O_2-$ in the parenthesis in Formula (3) above may be any structure selected from $-CH_2-CHOH-CH_2O-$ and $-CH(CH_2OH)CH_2O-$.

A weight average molecular weight of the polyglycerol derivative of the present disclosure is preferably from 200 to 3000, more preferably from 400 to 1500, and even more preferably from 400 to 800. When the weight average molecular weight is in the range described above, surface activity and workability tend to improve.

Note that, in the present disclosure, the weight average molecular weight can be measured by gel permeation chromatography (GPC).

Examples of the polyglycerol derivative of the present disclosure include $C_{12}H_{25}O-(C_3H_6O_2)_4-H$,
$C_{12}H_{25}O-(C_3H_6O_2)_{10}-H$,
$C_{12}H_{25}O-(C_3H_6O_2)_{20}-H$,
$HO-(C_3H_6O_2)_{10}-H$,
$HO-(C_3H_6O_2)_{20}-H$,
$CH_2=CH-CH_2-O-(C_3H_6O_2)_6-H$,
$CH_2=CH-CH_2-O-(C_3H_6O_2)_6-H$,
$CH_3-(CH_2)_7-CH=CH-(CH_2)_8-O-(C_3H_6O_2)_4-H$, and
$CH_3-(CH_2)_7-CH=CH-(CH_2)_8-O-(C_3H_6O_2)_{10}-H$.

The polyglycerol derivative of the present disclosure can be produced by, for example, a method of adding 2,3-epoxy-1-propanol to an aliphatic alcohol corresponding to $R^c$ in the presence of an alkali catalyst.

A content of the polyglycerol derivative represented by Formula (3) above in the detergent composition of the present disclosure is preferably from 0.01 to 15 wt. %, more preferably from 0.05 to 10 wt. %, and even more preferably from 0.1 to 5 wt. %.

The detergent composition of the present disclosure may contain two or more types of polyglycerol derivatives represented by Formula (3) above.

Furthermore, the detergent composition of the present disclosure may contain another polyglycerol derivative, such as polyglycerol diether and polyglycerol diester, besides the polyglycerol derivative represented by Formula (3) above.

A content of the polyglycerol derivative of Formula (3) above with respect to the total amount of the polyglycerol derivative of Formula (3) above and other polyglycerol derivatives is preferably 75% or greater, and more preferably 90% or greater. When the content is less than 75%, all the polyglycerol derivatives are less likely to dissolve.

Note that the content of the polyglycerol derivative can be determined based on an area ratio obtained by dissolving and separating a product by high performance liquid chromatography and determining the peak area by a differential refractometer.

Chelating Agent

The detergent composition of the present disclosure may contain a chelating agent to further enhance effect of removal of polishing agents, polishing sludge, anticorrosives, and films by anticorrosives. The chelating agent used in the present disclosure may be a nitrogen-containing compound represented by Formula (4) below. In Formula (4), X represents a carboxyl group or a phosphonic acid group. $R^d$ and $R^e$ are the same or different and each represents a hydrogen atom or a monovalent hydrocarbon group that may have a substituent, and $R^f$ represents a divalent hydrocarbon group that may have a substituent. Any two of $R^d$ to $R^f$ may bond to each other and form a ring together with the adjacent nitrogen atom.

[Chem. 8]

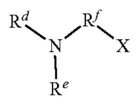

(4)

Examples of the monovalent hydrocarbon group of $R^d$ and $R^e$ include monovalent aliphatic hydrocarbon groups, monovalent alicyclic hydrocarbon groups, and monovalent aromatic hydrocarbon groups.

Examples of the monovalent aliphatic hydrocarbon group of $R^d$ and $R^e$ include linear or branched alkyl groups, linear or branched alkenyl groups, and linear or branched alkynyl groups.

The linear or branched alkyl group of $R^d$ and $R^e$ is a linear alkyl group having preferably from 1 to 12 carbons, more preferably from 1 to 8 carbons, and even more preferably from 2 to 4 carbons, or a branched alkyl group having preferably from 3 to 12 carbons, more preferably from 3 to 8 carbons, and even more preferably from 3 to 6 carbons. Examples of the linear or branched alkyl group include a methyl group, an ethyl group, a propyl group, a butyl group, a pentyl group, a hexyl group, a decyl group, a dodecyl group, a tetradecyl group, an octadecyl group, an isopropyl group, an isobutyl group, a sec-butyl group, a tert-butyl group, and a 2-ethylhexyl group.

The linear or branched alkenyl group of $R^d$ and $R^e$ is a linear alkenyl group having preferably from 2 to 12 carbons, more preferably from 2 to 8 carbons, and even more preferably from 2 to 4 carbons, or is a branched alkenyl group having preferably from 3 to 12 carbons, more preferably from 3 to 8 carbons, and even more preferably from 3 to 6 carbons. Examples of the linear or branched alkenyl group include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 3-hexenyl group, a 5-hexenyl group, a 1-heptenyl group, a 1-octenyl group, a 1-nonenyl group, a 1-decenyl group, an isopropenyl group, a 2-methyl-1-propenyl group, a methallyl group, a 3-methyl-2-butenyl group, and a 4-methyl-3-pentenyl group.

The linear or branched alkynyl group of $R^d$ and $R^e$ is a linear alkynyl group having preferably from 2 to 12 carbons, more preferably from 2 to 8 carbons, and even more preferably from 2 to 4 carbons, or a branched alkynyl group having preferably from 3 to 12 carbons, more preferably from 3 to 8 carbons, and even more preferably from 3 to 6 carbons. Examples of the linear or branched alkynyl group include an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, a 4-pentynyl group, a 1-hexynyl group, a 2-hexynyl group, a 3-hexynyl group, a 4-hexynyl group, a 5-hexynyl group, a 1-heptynyl group, a 1-octynyl group, a 1-nonynyl group, a 1-decynyl group, a trimethylsilylethynyl group, and a triethylsilylethynyl group.

Examples of the alicyclic hydrocarbon group of $R^d$ and $R^e$ include a cycloalkyl group and a cycloalkenyl group.

The cycloalkyl group of $R^d$ and $R^e$ is a cycloalkyl group having preferably from 3 to 12 carbons, more preferably from 4 to 10 carbons, and even more preferably from 5 to 8 carbons. Examples of the cycloalkyl group include a cyclopropyl group, a cyclobutyl group, a cyclopentyl group, a cyclohexyl group, a cycloheptyl group, a cyclooctyl group, a cyclononyl group, and a cyclodecyl group.

The cycloalkenyl group of $R^d$ and $R^e$ is a cycloalkenyl group having preferably from 3 to 12 carbons, more preferably from 4 to 10 carbons, and even more preferably from 5 to 8 carbons. Examples of the cycloalkenyl group include a cyclopentenyl group and a cyclohexenyl group.

The monovalent aromatic hydrocarbon group of $R^d$ and $R^e$ is an aryl group having preferably from 6 to 18 carbons, more preferably from 6 to 18 carbons, and even more preferably from 6 to 10 carbons. Examples of the monovalent aromatic hydrocarbon group include a phenyl group and a naphthyl group.

Each of the monovalent aliphatic hydrocarbon group, monovalent alicyclic hydrocarbon group, or monovalent aromatic hydrocarbon group of $R^d$ and $R^e$ may have the other as a substituent, and may be bonded to each other through an oxygen atom or a sulfur atom.

The divalent hydrocarbon group of R is preferably a monovalent hydrocarbon group of $R^d$ or $R^e$ described above with one of the hydrogen atoms replaced with a single bond.

The substituents that may be included in $R^d$ to R are the same or different and are at least one group selected from the group consisting of a carboxyl group, a phosphonic acid group, an amide group, an N-substituted amide group, a hydroxyl group, a thiol group, an amino group, an N-substituted amino group, an N,N-substituted amino group, an imino group, an N-substituted imino group, an alkylidene group, a heterocyclic group having at least one nitrogen atom as a hetero atom, a halogen atom (fluorine atom, chlorine atom, bromine atom, iodine atom), an oxo group, a substituted oxo group (e.g., an alkoxy group having from 1 to 4 carbon(s), an aryloxy group having from 6 to 10 carbons, an aralkyloxy group having from 7 to 16 carbons, and an acyloxy group having from 1 to 4 carbon(s)), a carboxyl group, a substituted oxycarbonyl group (e.g., an alkoxycarbonyl group having from 1 to 4 carbon(s), an aryloxycarbonyl group having from 6 to 10 carbons, and an aralkyloxycarbonyl group having from 7 to 16 carbons), a cyano group, a nitro group, and a sulfo group. Among these, a carboxyl group, a phosphonic acid group, an amide group, an N-substituted amide group, a hydroxyl group, a thiol group, an amino group, an N-substituted amino group, an N,N-substituted amino group, an imino group, an N-substituted imino group, an alkylidene group, and a heterocyclic group having at least one nitrogen atom as a hetero atom are preferred.

The linear or branched alkylidene group that may be included in $R^d$ to R is a linear alkylidene group having preferably from 1 to 12 carbons, more preferably from 1 to 8 carbons, and even more preferably from 2 to 4 carbons, or a branched alkylidene group having preferably from 3 to 12 carbons, more preferably from 3 to 8 carbons, and even more preferably from 3 to 6 carbons. Examples of the linear or branched alkylidene group include a methylidene group, a propylidene group, an isopropylidene group, a butylidene group, an isobutylidene group, a sec-butylidene group, a pentylidene group, an isopentylidene group, an octylidene group, and an isooctylidene group.

Examples of the heterocyclic group having at least one nitrogen atom as a hetero atom that may be included in $R^d$ to $R^f$ include a pyrrolidine ring, a pyrroline ring, a piperidine ring, a pyrrole ring, an imidazolidine ring, an imidazole ring, a piperazine ring, a pyridine ring, a diazine ring, a triazine ring, and an indole ring.

The total number of carboxyl groups and phosphonic acid groups that may be included in $R^d$ to $R^f$ is preferably from 0 to 4, and more preferably from 1 to 2.

The total number of amide groups, N-substituted amide groups, and thiol groups that may be included in $R^d$ to $R^f$ is preferably from 0 to 4, and more preferably from 1 to 2.

The total number of amino groups, N-substituted amino groups, and N,N-substituted amino groups that may be included in $R^d$ to $R^f$ is preferably from 0 to 6, more preferably from 1 to 4, and even more preferably from 1 to 2.

The total number of imino groups and N-substituted imino groups that may be included in $R^d$ to $R^f$ is preferably from 0 to 4, and more preferably from 1 to 2.

The total number of hydroxyl groups that may be included in $R^d$ to $R^f$ is preferably from 0 to 4, and more preferably from 1 to 2.

A substituent included in the N-substituted amino group, N,N-substituted amino group, and N-substituted imino group is the same as the hydrocarbon group that may be included in $R^d$ to $R^f$ described above.

Any two of $R^d$ to $R^f$ may bond to each other and form a ring together with the adjacent nitrogen atom. Examples of the ring to be formed include a pyrrolidine ring, a pyrroline ring, a piperidine ring, a pyrrole ring, an imidazolidine ring, an imidazole ring, a piperazine ring, an imidazolidine ring, a pyridine ring, a diazine ring, a triazine ring, and an indole ring.

Specific examples of the nitrogen-containing compound represented by Formula (4) include: an amino acid, in which X of Formula (4) is a carboxyl group and at least one of $R^d$ or $R^e$ is a hydrogen atom; an aminocarboxylic acid, in which X of Formula (4) is a carboxyl group and $R^d$ and $R^e$ are linear or branched alkyl groups having the carboxyl group through an N,N-substituted amino group; and an aminophosphonic acid, in which X in Formula (4) is a phosphonic acid group and $R^d$ and $R^e$ are linear or branched alkyl groups having the phosphonic acid through an N,N-substituted amino group.

Examples of the amino acid include glycine, serine, proline, histidine, isoleucine, leucine, lysine, methionine, phenylalanine, threonine, tryptophan, valine, arginine, asparagine, aspartic acid, cysteine, glutamine, glutamic acid, ornithine, picolinic acid, nicotinic acid, 4-imidazolecarboxylic acid, selenocysteine, tyrosine, sarcosine, tricine, 3-amino-1,2,4-triazole-5-carboxylic acid, and 4,6-dimorpholin-4-yl-[1,3,5]triazine-2-carboxylic acid.

Examples of the aminocarboxylic acid include ethylenediaminetetracarboxylic acid, nitrilotricarboxylic acid, diethylenetriaminepentacarboxylic acid, hydroxyethylethylenediaminetricarboxylic acid, triethylenetetraaminehexacarboxylic acid, 1,3-propanediaminetetracarboxylic acid, 1,3-diamino-2-hydroxypropanetetracarboxylic acid, hydroxyethyliminodicarboxylic acid, dihydroxyethylglycine, glycol ether diamine tetracarboxylic acid, and phosphonobutanetricarboxylic acid.

Examples of the aminophosphonic acid include hydroxyethylidene diphosphonic acid, nitrilotris(methylenephosphonic acid), and ethylenediamine tetra(methylene phosphonic acid).

One of these can be used alone or two or more in combination.

In the chelating agent, the carboxyl group or the phosphonic group may form a salt with a counter ion (e.g., Na ion, Ca ion, Mg ion, Cu ion, and Mn ion).

A content of the chelating agent in the detergent composition of the present disclosure is preferably from 0.05 to 25 wt. %, more preferably from 0.2 to 15 wt. %, and even more preferably from 0.2 to 0.5 wt. %.

As long as the cleaning of metal wiring of a substrate is not adversely affected, the detergent composition of the present disclosure may contain an additional component besides the alkanol hydroxylamine compound, the basic compound, the polyglycerol derivative, and the chelating agent described above; however, the content of such an additional component is preferably from 0.01 to 2.0 wt. %, and more preferably from 0.05 to 1.5 wt. %, in the composition.

The pH of the detergent composition of the present disclosure is from 10 to 13, and preferably from 11.5 to 12.5. When the pH is adjusted within this range, removal of polishing agents, polishing sludge, anticorrosives, and films containing anticorrosives by the alkanol hydroxylamine compound described above and suppression of corrosion and oxidation of the metal wiring surface become more effective.

A weight ratio of the alkanol hydroxylamine compound to the basic compound (alkanol hydroxylamine compound/basic compound) in the detergent composition of the present disclosure is preferably from 1 to 10, more preferably from 1.2 to 7, and even more preferably from 1.4 to 5, from the perspective of being capable of adjusting the pH of the detergent composition into the range described above.

The detergent composition of the present disclosure can be produced by a method, the method including adding the alkanol hydroxylamine compound and the like in ultrapure water and uniformly agitating the mixture, the ultrapure water being prepared by bubbling an inert gas (e.g., nitrogen gas) to remove dissolved oxygen.

Cleaning Method of Semiconductor Substrate Cleaning of a semiconductor substrate using the detergent composition of the present disclosure can be performed by a known cleaning method such as an immersion method, in which a substrate having metal wiring is immersed in the detergent composition described above, a spinning (dripping) method, and a spraying method. In addition, the cleaning of a semiconductor substrate can be carried out by employing a batch method of treating multiple substrates at once or a sheet method of treating a substrate one at a time.

A cleaning temperature during cleaning is, for example, from 15 to 30° C. The cleaning time is, for example, from 15 to 120 seconds.

Chemical-Mechanical Polishing Composition

A chemical-mechanical polishing composition of the present disclosure contains a composition containing the alkanol hydroxylamine compound, the basic compound, the polyglycerol derivative, and the optional chelating agent, and a polishing agent.

The chemical-mechanical polishing composition of the present disclosure exerts an effect of easily removing the polishing agent, polishing sludge, anticorrosives, and films containing anticorrosives in the cleaning after polishing and an effect of easily suppressing corrosion and oxidation of a metal wiring surface. In addition, interaction between the alkanol hydroxylamine compound and the polyglycerol derivative effectively mitigates aggregation of the polishing agent, and suppresses the formation of secondary particles. Thus, the chemical-mechanical polishing composition of the present disclosure can significantly reduce scratches of the polished object (semiconductor substrate such as a device wafer or substrate for a liquid crystal display) at the time of polishing.

A content of the alkanol hydroxylamine compound in the chemical-mechanical polishing composition of the present disclosure is preferably from 0.05 to 25 wt. %, more preferably from 0.1 to 15 wt. %, and even more preferably from 0.2 to 0.5 wt. %. When the content of the alkanol hydroxylamine compound is less than 0.05 wt. %, the chemical-mechanical polishing composition may not sufficiently suppress oxidation or corrosion of metal wiring in cleaning after the polishing. When the content is greater than 25 wt. %, the alkanol hydroxylamine compound may not dissolve in water and the composition may undergo phase separation.

A content of the polyglycerol derivative in the chemical-mechanical polishing composition of the present disclosure is preferably from 0.01 to 15 wt. %, more preferably from 0.05 to 10 wt. %, and even more preferably from 0.1 to 5 wt. %. When the content of the polyglycerol derivative is less than 0.01%, aggregation of the polishing agent cannot be mitigated and thus the size of the secondary particles increases, and thus scratching tends to occur on a surface of the polished object. When the content of the polyglycerol derivative is greater than 20 wt. %, the viscosity of the chemical-mechanical polishing composition becomes excessively high, and polishing operation tends to be difficult.

A weight ratio of the alkanol hydroxylamine compound to the polyglycerol derivative (alkanol hydroxylamine compound/polyglycerol derivative) in the chemical-mechanical polishing composition of the present disclosure is preferably from 0.003 to 10, more preferably from 0.01 to 5, and even more preferably from 0.05 to 3, from the perspective of suppressing formation of secondary particles due to aggregation of the polishing agent described below and reducing scratches on a polished object.

Polishing Agent

As the polishing agent according to the present disclosure, a known and commonly used polishing agent can be used. In particular, silicon dioxide, aluminum oxide, cerium oxide, silicon nitride, or zirconium oxide can be suitably used. These polishing agents can be used alone or in a combination of two or more types.

An average particle size determined by the BET method of the polishing agent is preferably from 0.005 to 10 μm. When the average particle size of the polishing agent is less than 0.005 μm, the polishing rate is extremely reduced. When the average particle size of the polishing agent is greater than 10 μm, scratching tends to occur.

A content of the polishing agent in the chemical-mechanical polishing composition of the present disclosure is preferably from 0.1 to 50 wt. %, more preferably from 0.5 to 40 wt. %, and even more preferably from 1 to 35 wt. %. When the chemical-mechanical polishing composition has the content of the polishing agent in the range described above, the viscosity of the polishing composition can be adjusted to a range that is suitable for the polishing, and the polishing rate can be improved.

A weight ratio of the alkanol hydroxylamine compound to the polishing agent (alkanol hydroxylamine compound/polishing agent) in the chemical-mechanical polishing composition of the present disclosure is preferably from 0.001 to 0.5, more preferably from 0.01 to 0.4, and even more preferably from 0.05 to 0.3, from the perspective of suppressing formation of secondary particles due to aggregation of the polishing agent and reducing scratches on a polished object.

Examples of the water used for the chemical-mechanical polishing composition of the present disclosure include ultrapure water, ion exchanged water, distilled water, and tap water. A content of the water in the chemical-mechanical polishing composition is, for example, from 40 to 99 wt. %, preferably from 45 to 95 wt. %, and more preferably from 55 to 90 wt. %. When the chemical-mechanical polishing composition has the content of the water in the range described above, the viscosity of the chemical-mechanical polishing composition can be adjusted to a range that is suitable for the polishing, and the polishing rate can be improved.

The chemical-mechanical polishing composition of the present disclosure may contain, as necessary, an additive such as rust inhibitors, viscosity modifiers, surfactants, pH adjusters, antiseptics, and antifoaming agents, besides the basic compound, the polyglycerol derivative, and the chelating agent.

A content of the additive in the chemical-mechanical polishing composition of the present disclosure is preferably from 0.001 to 10 wt. %, more preferably from 0.05 to 5 wt. %, and even more preferably from 0.01 to 2 wt. %.

The pH of the chemical-mechanical polishing composition of the present disclosure is preferably from 10 to 13, and more preferably from 11.5 to 12.5.

The chemical-mechanical polishing composition of the present disclosure can be produced by mixing the detergent composition of the present disclosure and the raw materials described above such as the polishing agent by using a known and commonly used mixing apparatus. Furthermore, the chemical-mechanical polishing composition of the present disclosure can be produced by mixing the alkanol hydroxylamine compound, the basic compound, the polyglycerol derivative, the chelating agent, the polishing agent, water and other raw materials described above using a known and commonly used mixing apparatus.

The chemical-mechanical polishing composition is in a slurry form, and the particle distribution can be measured by using, for example, a laser scattering particle distribution analyzer.

Note that each of the configurations, combinations thereof, and the like in each of the embodiments are an example, and various additions, omissions, substitutions, and other changes may be made as appropriate without departing from the spirit of the present disclosure. The invention according to the present disclosure is not limited by the embodiments and is limited only by the claims.

Each aspect disclosed in the present specification can be combined with any other feature disclosed herein.

EXAMPLES

Hereinafter, the present disclosure will be described more specifically with reference to examples, but the present disclosure is not limited by these examples.

Detergent Composition

Examples 1 to 5 and Comparative Examples 1 and 2

Detergent compositions were prepared by blending the components listed in Table 1 in contents (wt. %) listed in Table 1.

For the detergent compositions, evaluations for maintenance of flatness, removal of polishing agent and the like, quality stability, corrosion prevention property, removal of complex-containing film, and formation of copper oxide film were performed as described below. The results are shown in Table 1.

Maintenance of Flatness

A semiconductor wafer (SEMATECH 845 (copper wiring, barrier metal TaN, oxide film TEOS), diameter: 8 inch, available from SEMATECH) was immersed in a 1% benzotriazole (BTA) aqueous solution for 1 hour to form a copper(I)-benzotriazole film on a copper wiring surface, and then washed with pure water, dried, and cut, and thus 2 cm×2 cm strip samples were produced. The sample was immersed in 10 mL of each of the detergent compositions of Examples and Comparative Examples for 1 hour, washed with pure water, and dried in a nitrogen gas stream, and then stored at 40° C. and a humidity of 75% for 1 day or 3 days. For each of the samples stored for 1 day or 3 days, change in roughness (recesses and protrusions) of a wiring surface was measured by using a scanning probe microscope (available from SII NanoTechnology Inc., NanoNavi-S-image, Dynamic force mode). A larger value indicated larger recesses and protrusions of the wiring surface, and a case where the difference between the roughness (recesses and protrusions) of the sample stored for 1 day and the roughness of the sample stored for 3 days was larger indicates that flatness had been poorly maintained.

Removal of Polishing Agent and the Like

For each of Examples and Comparative Examples, 10 mL of the detergent composition was charged in a centrifuge tube, then 100 μL of a silicon dioxide dispersion (0.2 g of silicon dioxide particles (available from Wako Pure Chemical Industries, Ltd.; particle diameter: 70 nm) was dispersed in 10 mL of ultrapure water) was added thereto, and thus a sample 1 was formed. Furthermore, 100 μL of copper sulfate ($CuSO_4$) aqueous solution was further added to the sample 1, and thus a sample 2 was prepared. By measuring the zeta potential for each of these samples 1 and 2, removal performance for a case of silicon dioxide (polishing agent) itself and removal performance for a case where the silicon dioxide (polishing agent) and copper ions (polishing sludge) coexist were evaluated. The smaller numerical value of zeta potential indicates superior removal performance by the detergent composition.

Quality Stability

For each of Examples and Comparative Examples, 50 mL of the detergent composition was charged and sealed in a 100 mL container made of polyethylene, and stored in a thermostatic oven at 40° C. for 1 week. Presence or absence of coloring of the detergent composition (colorless and clear) was visually observed immediately after the detergent composition was charged and sealed in the container. The presence of coloring indicates poor quality stability of the detergent composition.

Good: The composition was not colored.

Poor: The composition was colored.

Corrosion Prevention Property

For the post-treatment sample of 1 day storage period prepared in the same manner as in the evaluation of maintenance of flatness, the degree of corrosion of a copper wiring surface was observed by a field emission scanning electron microscope (S-4800, available from Hitachi High-Technologies Corporation). The evaluation criteria are as follows.

Good: The wiring surface did not corrode at all.

Poor: At least a part of the wiring surface corroded.

Removal of Complex-Containing Film (1) A copper-plated silicon substrate (copper plating film thickness: 1.5 μm; diameter: 8 inch; available from SEMATECH) was immersed in a 1% benzotriazole (BTA) aqueous solution for 1 hour and a copper(I)-BTA film was formed on a copper wiring surface. Then the substrate was washed with pure water, dried, and cut. Thus 2 cm×2 cm strip samples were prepared. The sample was immersed in 10 mL of each of the compositions of Examples and Comparative Examples for 1 hour, washed with pure water, and dried in a nitrogen gas stream, and then stored at 40° C. and a humidity of 75% for 1 day.

(2) A copper-plated silicon substrate (film thickness of copper plating: 1.5 μm; diameter: 4 inch; available from SEMATECH) was washed by methanol and isopropanol in this order and was immersed in a 1% quinaldic acid (QCA) aqueous solution containing 0.07% of hydrogen peroxide solution for 30 seconds and a copper(II)-QCA film was formed on a copper wiring surface. Then the substrate was washed with pure water, dried, and cut, and thus 2 cm×2 cm strip samples were formed. The samples of (1) and (2) described above were immersed in 10 mL of each of the compositions of Examples and Comparative Examples for 1 hour, washed with pure water, and dried in a nitrogen gas stream, and then stored at 40° C. and a humidity of 75% for 1 day. For each of the samples stored for 1 day, removal of the copper(I)-BTA film and the copper(II)-QCA film was examined by an X-ray photoelectron spectroscope (XPS) (AXIS-His, available from KRATOS) to observe N1s spectrum intensity. That is, if the N1s spectrum intensity was found to be the same as that of a copper-plated substrate without any film (purchased as is), it was judged that the copper(I)-BTA film or the copper(II)-QCA film had been removed.

Formation of Copper Oxide Film

In the evaluation of removal of complex-containing film, it was judged that, for all the cases of Examples and Comparative Examples (except Comparative Example 1), the copper(I)-BTA film or the copper(II)-QCA film had been removed. For each of these samples from which these films had been removed, LMM analysis line of copper was measured by an X-ray photoelectron spectroscope (XPS) (AXIS-His, available from KRATOS), and the abundance ratio of the copper(I) oxide with respect to metal copper was calculated based on the analysis line intensities of the copper(I) oxide and the metal copper formed on the copper plating surface. The results are shown in Table 1. Furthermore, using an argon sputtering system included in the X-ray photoelectron spectroscope (XPS), a surface of each of the samples was etched for 35 seconds (etching amount equivalent to a thickness of 3.5 nm of silicon dioxide), the abundance ratio of the copper(I) oxide formed inside of the copper plating with respect to the metal copper after the etching was calculated by the same method described above. When both values of the abundance ratios of the copper(I) oxide with respect to the metal copper before the etching and after the etching, it suggested that copper(I) oxide films were thick.

It was found that, for the detergent compositions of Examples 1 to 5, the roughness (recesses and protrusions) of the sample stored for 1 day was 1.5 to 1.7, the roughness of the sample stored for 3 days was 1.5 to 1.9, and the difference thereof was 0 to 0.2, which were all small. Thus excellent maintenance of flatness of the semiconductor wafer surface was achieved. It was also found that the detergent compositions of Examples 1 to 5 achieved excellent effects of removal of polishing agent and the like, quality stability, corrosion prevention property, removal of complex-containing film, and formation of copper oxide film. On the other hand, the detergent composition of Comparative Example 1 had the roughness (recesses and protrusions) of the sample stored for 1 day of 6.3, the roughness of the sample stored for 3 days of 9.1, and the difference thereof of 2.8, which were significantly large. The detergent composition of Comparative Example 2 had the roughness (recesses and protrusions) of the sample stored for 3 days of 5.8 and the difference between the samples stored for 1 day and 3 days of 4.7, which were significantly large.

TABLE 1

| (wt. %) | Reducing agent 1 | Reducing agent 2 | Chelating agent Histidine | Chelating agent 4ICA | Basic Compound Choline | Water | Weight ratio (reducing agent/basic compound) | pH | Maintenance of flatness: Stored for 1 day | Maintenance of flatness: Stored for 3 days | Maintenance of flatness: Difference | Removal of polishing agent and the like Zeta potential (mV): Polishing agent only | Removal of polishing agent and the like Zeta potential (mV): Polishing agent and polishing sludge | Quality stability | Corrosion prevention property | Removal of complex-containing film (1) BTA | Removal of complex-containing film (2) QCA | Formation of copper oxide film (abundance ratio): Before etching | Formation of copper oxide film (abundance ratio): After etching |
|---|---|---|---|---|---|---|---|---|---|---|---|---|---|---|---|---|---|---|---|
| Example 1 | 0.15 | 0 | 0.15 | 0 | 0.1 | Remainder | 1.5 | 10.8 | 1.7 | 1.9 | 0.2 | −55 | −45 | Good | Good | Removed | Removed | 1.0 | 0.9 |
| Example 2 | 0.24 | 0 | 0 | 0.5 | 0.1 | Remainder | 2.4 | 11.5 | 1.6 | 1.6 | 0 | −60 | −45 | Good | Good | Removed | Removed | 1.0 | 0.9 |
| Example 3 | 0.15 | 0 | 0.1 | 0 | 0.1 | Remainder | 1.5 | 11.5 | 1.6 | 1.6 | 0 | −60 | −45 | Good | Good | Removed | Removed | 1.1 | 1.0 |
| Example 4 | 0.30 | 0 | 0.1 | 0 | 0.1 | Remainder | 3.0 | 12.0 | 1.5 | 1.5 | 0 | −55 | −45 | Good | Good | Removed | Removed | 1.1 | 1.0 |
| Example 5 | 0.24 | 0 | 0.18 | 0 | 0.1 | Remainder | 2.4 | 12.5 | 1.5 | 1.6 | 0.1 | −60 | −40 | Good | Good | Removed | Removed | 1.1 | 1.0 |
| Comparative Example 1 | 0 | 0 | 0.1 | 0 | 0.1 | Remainder | — | 11.5 | 6.3 | 9.1 | 2.8 | −58 | −38 | Good | — | — | — | 0.4 | 0.2 |
| Comparative Example 2 | 0 | 0.15 | 0.1 | 0 | 0.1 | Remainder | 1.5 | 10.5 | 1.7 | 5.8 | 4.7 | −60 | −42 | Good | Good | Removed | Removed | 1.1 | 0.6 |

In the table,represents "not determined".

Reducing agent 1: N,N-di(2-hydroxyethyl)-N-hydroxylamine, reducing agent 2: N,N-diethylhydroxylamine, 4ICA: 4-imidazolecarboxylic acid, choline: 2-hydroxyethyltrimethylammonium hydroxide

Chemical-Mechanical Polishing Composition

Examples 6 and 7 and Comparative Examples 3 to 6

Chemical-mechanical polishing compositions were prepared by blending the components listed in Table 2 in contents (wt. %) listed in Table 2, and mixing by using a mixer (trade name "T.K. HOMO MIXER", available from PRIMIX Corporation).

For the chemical-mechanical polishing compositions, polishing performance and filtration performance were evaluated as described below. The results are shown in Table 2.

Polishing Performance

As a polished object, a silicon wafer having a diameter of 8 inch obtained by forming a 1 μm thick film of silicon oxide on a surface by a thermal oxidation method was used. As a polishing machine, a single-side polishing machine (trade name "EPO113", available from Ebara Corporation) was used. As a polishing pad, trade name "IC1000" (available from Rodel Inc.) was used.

Polishing Conditions

Processing pressure: 5 psi

Plate rotation speed: 60 rpm

Wafer rotation number: 50 rpm

CMP polishing composition supply amount: 150 mL/min

Polishing time: 2 minutes

The silicon wafer was polished with the polishing conditions described above. After the polishing, the silicon wafer was washed with pure water and dried. Then, scratches on the silicon wafer surface, which had been created by the polishing and had a length of 0.2 μm or longer were observed and evaluated based on the following criteria. Note that, for measurement of the scratches, "Surfscan SP-1" (trade name, available from KLA-Tencor Corporation) was used.

Evaluation Criteria

Excellent: The number of scratches was 0.

Good: The number of scratches was 1 or greater and less than 5.

Marginal: The number of scratches was 5 or greater and less than 10.

Poor: The number of scratches was 10 or greater.

Filtration Test

Each of the CMP polishing compositions 1 to 10 used for polishing was recovered, and, using a membrane filter (diameter: 47 mm) having a pore diameter of 1 μm, 1 L of each of the CMP polishing compositions was filtered at a primary side pressure (unfiltered liquid side of the filter: p1) of 2 $kg/cm^2$, and the secondary side pressure (filtrate side of the filter: p2) was measured. The pressure loss was calculated based on the following equation, and the filtration performance was evaluated based on the following criteria. Note that, for the pressure measurement, "Manostar gauge WO81FN100" (trade name, available from Yamamoto Keiki MFG. Co., Ltd.) was used.

$$\text{Pressure loss}(\%)=\{(p1-p2)/p1\}\cdot 100$$

Evaluation Criteria

Excellent: less than 5%

Good: 5% or greater and less than 30%

Marginal: 30% or greater and less than 50%

Poor: 50% or greater or filtration was not possible due to clogging in the middle of the process The raw materials used in Examples and Comparative Examples are as described below.

(Polyglycerol Derivative)

C1: material obtained by adding 20 mol of 2,3-epoxy-1-propanol (trade name "Glycidol", available from Daicel Corporation) to 1 mol of lauryl alcohol C2: material obtained by adding 19 mol of 2,3-epoxy-1-propanol (trade name "Glycidol", available from Daicel Corporation) to 1 mol of glycerol Polyoxyalkylene Derivative A1: material obtained by adding 48 mol of ethylene oxide to 1 mol of ethylene glycol and then adding 38 mol of propylene oxide A2: material obtained by adding 20 mol of ethylene oxide to 1 mol of lauryl alcohol Polishing Agent Material containing colloidal silica (average primary particle size: 0.035 μm) and cerium oxide (average primary particle size: 0.2 μm)

The chemical-mechanical polishing compositions of Examples 6 and 7 had excellent polishing performance and excellent filtration performance and were able to suppress formation of scratches on a silicon wafer surface and were able to suppress pressure loss at the time of filtration through a membrane filter. On the other hand, the chemical-mechanical polishing compositions of Comparative Examples 3 and 4 had excellent polishing performance but marginal filtration performance. Furthermore, the chemical-mechanical polishing compositions of Comparative Examples 5 and 6, which used a polyoxyalkylene derivative, had marginal or poor polishing performance and poor filtration performance.

TABLE 2

| | a N,N-bis(2-hydroxyethyl)-N- | b Poly glycerol derivative | | Weight ratio | Polyoxy alkylene derivative | | Basic Compound | c Polishing | Weight ratio | | Polishing perfor- | Filtration perfor- |
|---|---|---|---|---|---|---|---|---|---|---|---|---|
| (wt. %) | hydroxylamine | C1 | C2 | (a/b) | A1 | A2 | Ammonia | agent | (a/c) | Water | mance | mance |
| Example 6 | 0.18 | 1.78 | 0 | 0.10 | 0 | 0 | 0.1 | 1.78 | 0.10 | Remainder | Excellent | Excellent |
| Example 7 | 0.18 | 0 | 1.78 | 0.10 | 0 | 0 | 0.1 | 1.78 | 0.10 | Remainder | Excellent | Excellent |
| Comparative Example 3 | 0 | 1.78 | 0 | — | 0 | 0 | 0.1 | 1.78 | — | Remainder | Excellent | Marginal |
| Comparative Example 4 | 0 | 0 | 1.78 | — | 0 | 0 | 0.1 | 1.78 | — | Remainder | Excellent | Marginal |
| Comparative Example 5 | 0 | 0 | 0 | — | 1.78 | 0 | 0.1 | 1.78 | — | Remainder | Marginal | Poor |
| Comparative Example 6 | 0 | 0 | 0 | — | 0 | 1.78 | 0.1 | 1.78 | — | Remainder | Poor | Poor |

Hereinafter, variations of the invention according to the present disclosure will be described.

[Supplementary Note 1] A detergent composition containing an alkanol hydroxylamine compound represented by General Formula (1) and having a pH of 10 to 13:

[Chem 1]

(1)

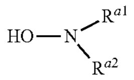

where, $R^{a1}$ and $R^{a2}$ are the same or different and each represents a hydrogen atom or an alkyl group having from 1 to 10 carbons that may have from 1 to 3 hydroxyl groups, with the proviso that $R^{a1}$ and $R^{a2}$ are not simultaneously hydrogen atoms, and a total number of hydroxyl groups present in $R^{a1}$ and $R^{a2}$ is not 0.

[Supplementary Note 2] The detergent composition according to Supplementary Note 1, where $R^{a1}$ and $R^{a2}$ are alkyl groups, the alkyl groups each having from 1 to 10 carbons and having 1 hydroxyl group.

[Supplementary Note 3] The detergent composition according to Supplementary Note 1 or 2, where a content of the alkanol hydroxylamine compound is from 0.05 to 25 wt. %.

[Supplementary Note 4] The detergent composition according to any one of Supplementary Notes 1 to 3, where a content of the alkanol hydroxylamine compound is from 0.2 to 0.5 wt. %.

[Supplementary Note 5] The detergent composition according to any one of Supplementary Notes 1 to 4, where the alkanol hydroxylamine compound is dialkanol hydroxylamine.

[Supplementary Note 6] The detergent composition according to any one of Supplementary Notes 1 to 5, where the alkanol hydroxylamine compound is N,N-bis(2-hydroxyethyl)-N-hydroxylamine.

[Supplementary Note 7] The detergent composition according to any one of claims 1 to 6, further containing a basic compound besides the alkanol hydroxylamine compound.

[Supplementary Note 8] The detergent composition according to Supplementary Note 7, where the basic compound is a quaternary ammonium hydroxide represented by General Formula (2):

[Chem. 2]

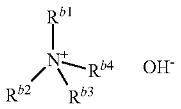

(2)

where, $R^{b1}$ to $R^{b4}$ are the same or different and each represents a hydrocarbon group that may have a substituent.

[Supplementary Note 9] The detergent composition according to Supplementary Note 8, where the hydrocarbon groups of $R^{b1}$ to $R^{b4}$ described above are linear, branched, or cyclic alkyl groups each having from 1 to 10 carbons.

[Supplementary Note 10] The detergent composition according to Supplementary Note 8, where the hydrocarbon groups of $R^{b1}$ to $R^{b4}$ described above are linear alkyl groups each having from 1 to 5 carbons or branched alkyl groups each having from 3 to 5 carbons.

[Supplementary Note 11] The detergent composition according to Supplementary Note 8, where the hydrocarbon groups of $R^{b1}$ to $R^{b4}$ described above are a methyl group, an ethyl group, an n-propyl group, or an isopropyl group.

[Supplementary Note 12] The detergent composition according to Supplementary Note 7, where the basic compound is ammonia, tetramethylammonium hydroxide, or 2-hydroxyethyltrimethylammonium hydroxide.

[Supplementary Note 13] The detergent composition according to any one of Supplementary Notes 7 to 12, where a content of the basic compound is from 0.01 to 5 wt. %.

[Supplementary Note 14] The detergent composition according to any one of Supplementary Notes 7 to 12, where a content of the basic compound is from 0.1 to 1 wt. %.

[Supplementary Note 15] The detergent composition according to any one of Supplementary Notes 7 to 14, where a weight ratio of the alkanol hydroxylamine compound to the basic compound (alkanol hydroxylamine compound/basic compound) in the detergent composition is from 1 to 10.

[Supplementary Note 16] The detergent composition according to any one of Supplementary Notes 7 to 14, where the weight ratio of the alkanol hydroxylamine compound to the basic compound (alkanol hydroxylamine compound/basic compound) in the detergent composition is from 1.4 to 5.

[Supplementary Note 17] The detergent composition according to any one of Supplementary Notes 1 to 16, further containing a polyglycerol derivative represented by General Formula (3):

$$R^cO\text{-}(C_3H_6O_2)_n\text{-}H$$

where, $R^c$ represents a hydrogen atom or a hydrocarbon group that may have a hydroxyl group, and n is an integer from 2 to 40.

[Supplementary Note 18] The detergent composition according to Supplementary Note 17, where the hydrocarbon group of $R^c$ described above is a linear alkyl group having from 12 to 18 carbons, a branched alkyl group having from 3 to 18 carbons, or an aliphatic acyl group having from 2 to 24 carbons.

[Supplementary Note 19] The detergent composition according to Supplementary Note 17, where the hydrocarbon group of $R^c$ described above is a dodecyl group, a stearyl group, an acetyl group, or an oleoyl group.

[Supplementary Note 20] The detergent composition according to any one of Supplementary Notes 17 to 19, where n described above is from 2 to 40.

[Supplementary Note 21] The detergent composition according to any one of Supplementary Notes 17 to 19, where n described above is from 4 to 20.

[Supplementary Note 22] The detergent composition according to any one of Supplementary Notes 17 to 21, where a weight average molecular weight of the polyglycerol derivative is from 200 to 3000.

[Supplementary Note 23] The detergent composition according to any one of Supplementary Notes 17 to 21, where a weight average molecular weight of the polyglycerol derivative is from 400 to 800.

[Supplementary Note 24] The detergent composition according to any one of Supplementary Notes 17 to 23, where a content of the polyglycerol derivative is from 0.01 to 15 wt. %.

[Supplementary Note 25] The detergent composition according to any one of Supplementary Notes 17 to 23, where the content of the polyglycerol derivative is from 0.1 to 5 wt. %.

[Supplementary Note 26] The detergent composition according to any one of Supplementary Notes 1 to 25, further containing a chelating agent represented by General Formula (4):

[Chem. 4]

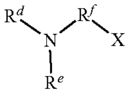

(4)

where, X represents a carboxyl group or a phosphonic acid group, $R^d$ and $R^e$ are the same or different and each represents a hydrogen atom or a monovalent hydrocarbon group that may have a substituent, and R represents a divalent hydrocarbon group that may have a substituent, and any two of $R^d$ to $R^f$ may bond to each other to form a ring together with an adjacent nitrogen atom.

[Supplementary Note 27] The detergent composition according to Supplementary Note 26, where the chelating agent is an amino acid, an aminocarboxylic acid, or an aminophosphonic acid.

[Supplementary Note 28] The detergent composition according to Supplementary Note 26, where the chelating agent is histidine or 4-imidazolecarboxylic acid.

[Supplementary Note 29] The detergent composition according to any one of Supplementary Notes 26 to 28, where a content of the chelating agent is from 0.05 to 25 wt. %.

[Supplementary Note 30] The detergent composition according to any one of Supplementary Notes 26 to 30, where the content of the chelating agent is from 0.2 to 0.5 wt. %.

[Supplementary Note 31] The detergent composition according to any one of Supplementary Notes 1 to 30, where the pH is from 10 to 13.

[Supplementary Note 32] The detergent composition according to any one of Supplementary Notes 1 to 30, where the pH is from 11.5 to 12.5.

[Supplementary Note 33] A cleaning method of a semiconductor substrate, the method including cleaning a semiconductor substrate by a cleaning method selected from an immersion method, a spinning method, or a spraying method by using the detergent composition described in any one of Supplementary Notes 1 to 32.

[Supplementary Note 34] A chemical-mechanical polishing composition containing the detergent composition described in any one of Supplementary Notes 1 to 32, and a polishing agent.

[Supplementary Note 35] The chemical-mechanical polishing composition according to Supplementary Note 34, where a content of the alkanol hydroxylamine compound is from 0.05 to 25 wt. %.

[Supplementary Note 36] The chemical-mechanical polishing composition according to Supplementary Note 34, where a content of the alkanol hydroxylamine compound is from 0.2 to 0.5 wt. %.

[Supplementary Note 37] The chemical-mechanical polishing composition according to any one of Supplementary Notes 34 to 36, where a content of the polyglycerol derivative is from 0.01 to 15 wt. %.

[Supplementary Note 38] The chemical-mechanical polishing composition according to any one of Supplementary Notes 34 to 36, where the content of the polyglycerol derivative is from 0.1 to 5 wt. %.

[Supplementary Note 39] The chemical-mechanical polishing composition according to any one of Supplementary Notes 34 to 38, where a weight ratio of the alkanol hydroxylamine compound to the polyglycerol derivative (alkanol hydroxylamine compound/polyglycerol derivative) is from 0.003 to 10.

[Supplementary Note 40] The chemical-mechanical polishing composition according to any one of Supplementary Notes 34 to 38, where a weight ratio of the alkanol hydroxylamine compound to the polyglycerol derivative (alkanol hydroxylamine compound/polyglycerol derivative) is from 0.05 to 3.

[Supplementary Note 41] The chemical-mechanical polishing composition according to any one of Supplementary Notes 34 to 40, where an average particle size of the polishing agent is from 0.005 to 10 μm.

[Supplementary Note 42] The chemical-mechanical polishing composition according to any one of Supplementary Notes 34 to 41, where a content of the polishing agent is from 0.1 to 50 wt. %.

[Supplementary Note 43] The chemical-mechanical polishing composition according to any one of Supplementary Notes 34 to 41, where the content of the polishing agent is from 1 to 35 wt. %.

[Supplementary Note 44] The chemical-mechanical polishing composition according to any one of Supplementary Notes 34 to 43, where a weight ratio of the alkanol hydroxylamine compound to the polishing agent (alkanol hydroxylamine compound/polishing agent) is from 0.001 to 0.5.

[Supplementary Note 45] The chemical-mechanical polishing composition according to any one of Supplementary Notes 34 to 43, where a weight ratio of the alkanol hydroxylamine compound to the polishing agent (alkanol hydroxylamine compound/polishing agent) is from 0.05 to 0.3.

[Supplementary Note 46] The chemical-mechanical polishing composition according to any one of Supplementary Notes 34 to 45, where a content of water is from 40 to 99 wt. %.

[Supplementary Note 47] The chemical-mechanical polishing composition according to any one of Supplementary Notes 34 to 45, where the content of water is from 55 to 90 wt. %.

[Supplementary Note 48] The chemical-mechanical polishing composition according to any one of Supplementary Notes 34 to 47, where a pH is from 10 to 13.

[Supplementary Note 49] The chemical-mechanical polishing composition according to any one of Supplementary Notes 34 to 47, where the pH is from 11.5 to 12.5.

[Supplementary Note 50] Use of a composition containing the detergent composition described in any one of Supplementary Notes 1 to 32, and a polishing agent as a chemical-mechanical polishing composition.

[Supplementary Note 51] A method for producing a chemical-mechanical polishing composition, the method including mixing the detergent composition described in any one of Supplementary Notes 1 to 32, and a polishing agent.

INDUSTRIAL APPLICABILITY

The detergent composition of the present disclosure is used for cleaning a semiconductor substrate after CMP process, and is capable of sufficient removal of polishing agents, metal microparticles, and anticorrosives and long-term maintenance of substrate flatness after the cleaning, and achieves quality stability for a long period of time. Furthermore, the chemical-mechanical polishing composition of the present disclosure can suppress scratching on a polished object, such as a semiconductor substrate, and reduce filter clogging during filtration at the time of reuse. Thus, the present disclosure has industrial applicability.

The invention claimed is:

1. A detergent composition comprising:

A) an alkanol hydroxylamine compound represented by General Formula (1)

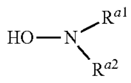

(1)

wherein:

i) $R^{a^1}$ and $R^{a^2}$ are the same or different and each represents a hydrogen atom or an alkyl group having from 1 to 10 carbons that may have from 1 to 3 hydroxyl groups, with the proviso that $R^{a^1}$ and $R^{a^2}$ are not simultaneously hydrogen atoms; and ii) a total number of hydroxyl group or groups present in $R^{a^1}$ and $R^{a^2}$ is not 0;

B) a basic compound besides the alkanol hydroxylamine compound;

C) a polyglycerol derivative represented by General Formula (3):

$$R^cO-(C_3H_6O_2)_n-H$$

where $R^c$ represents a hydrogen atom or a hydrocarbon group that may have a hydroxyl group, and n is an integer from 2 to 40:

D) a chelating agent represented by General Formula (4):

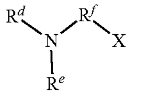

(4)

where X represents a carboxyl group or a phosphonic acid group; Rd and Re are the same or different and each represents a hydrogen atom or a monovalent hydrocarbon group that may have a substituent; and Rf represents a divalent hydrocarbon group that may have a substituent; and any two of Rd to Rf may bond to each other to form a ring together with an adjacent nitrogen atom; and E) from 0.01 to 2.0 wt. % of an additional component besides the alkanol hydroxylamine compound, the basic compound, the polyglycerol derivative, and the chelating agent;

wherein the composition has a pH of 10 to 13, and the weight ratio of the alkanol hydroxylamine compound to the basic compound (alkanol hydroxylamine compound/basic compound) in the detergent composition is from 1 to 10.

2. The detergent composition according to claim 1, wherein $R^{a1}$ and $R^{a2}$ are alkyl groups, the alkyl groups each having from 1 to 10 carbons and having 1 hydroxyl group.

3. The detergent composition according to claim 1, wherein a content of the alkanol hydroxylamine compound is from 0.05 to 25 wt. %.

4. The detergent composition according to claim 1, wherein the basic compound is a quaternary ammonium hydroxide represented by General Formula (2):

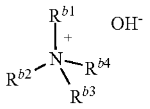

(2)

where $R^{b1}$ to $R^{b4}$ are the same or different and each represents a hydrocarbon group that may have a substituent.

5. The detergent composition according to claim 1, wherein the basic compound is ammonia, tetramethylammonium hydroxide, or 2-hydroxyethyltrimethylammonium hydroxide.

6. The detergent composition according to claim 1, wherein a content of the basic compound is from 0.01 to 5 wt. %.

7. A chemical-mechanical polishing composition comprising the detergent composition described in claim 1, and a polishing agent.

8. The detergent composition according to claim 1, wherein a weight average molecular weight of the polyglycerol derivative is from 200 to 3000.

9. The detergent composition according to claim 1, wherein a content of the polyglycerol derivative is from 0.01 to 15 wt. %.

10. The detergent composition according to claim 1, wherein a content of the chelating agent is from 0.05 to 25 wt. %.

11. The detergent composition according to claim 1, wherein the pH is from 11.5 to 12.5.

12. The chemical-mechanical polishing composition according to claim 7, wherein a content of the alkanol hydroxylamine compound is from 0.05 to 25 wt. %.

13. The chemical-mechanical polishing composition according to claim 7, wherein a content of the polyglycerol derivative is from 0.01 to 15 wt. %.

14. A cleaning method of semiconductor substrate using the detergent composition described in claim 1, and being used to clean the semiconductor substrate by an immersion method, a spinning method, or a spraying method.

15. A method for producing a chemical-mechanical polishing composition comprising mixing the detergent composition described in claim 1, and a polishing agent.

16. The detergent composition according to claim 2, wherein the alkyl group having from 1 to 10 carbon atoms of $R^{a1}$ and $R^{a2}$ are a linear alkyl group having from 1 to 5 carbons or a branched alkyl group having from 3 to 5 carbons, and having 1 hydroxyl group.

17. The detergent composition according to claim 1, wherein alkanol hydroxyl amine compound is N-(2-hydroxyethyl)-N-hydroxylamine, N-(1,3-dihydroxy-n-propyl)-N-hydroxylamine, N-ethyl-N-hydroxymethyl-N-hydroxylamine, N-ethyl-N-(2-hydroxyethyl)-N-hydroxylamine, N-ethyl-N-(1,2-dihydroxyethyl)-N-hydroxylamine, N,N-bis(1,2-dihydroxyethyl)-N-hydroxylamine, N,N-bis(2-hydroxyethyl)-N-hydroxylamine, or N,N-bis(2-hydroxypropyl)-N-hydroxylamine.

18. The detergent composition according to claim 1, wherein the compound of Formula (1) is N,N-di (2-hydroxyethyl)-N-hydroxylamine.

* * * * *